(12) United States Patent  
Bentley et al.

(10) Patent No.: US 7,965,463 B2  
(45) Date of Patent: Jun. 21, 2011

(54) RECORDING MULTIPLE CODEWORD SETS DURING LATENCY PERIOD

(75) Inventors: Steven R. Bentley, Tucson, AZ (US); Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 12/351,713

(22) Filed: Jan. 9, 2009

(65) Prior Publication Data

US 2010/0177424 A1 Jul. 15, 2010

(51) Int. Cl.
*G11B 5/09* (2006.01)

(52) U.S. Cl. .............................. 360/53; 360/48; 360/31

(58) Field of Classification Search .................... None
See application file for complete search history.

(56) References Cited

U.S. PATENT DOCUMENTS 6,833,970 B2 * 12/2004 Buckingham .................. 360/48
6,856,479 B2    2/2005 Jaquette et al.
6,958,873 B2 * 10/2005 Sved ............................... 360/53
6,970,311 B2   11/2005 Jaquette
7,119,974 B2   10/2006 Jaquette
2003/0030932 A1  2/2003 Sved
2004/0230741 A1 11/2004 Watanabe
2005/0041317 A1  2/2005 Jaquette
2005/0172206 A1  8/2005 Hana et al.
2006/0002002 A1  1/2006 Jaquette

FOREIGN PATENT DOCUMENTS

EP        0913826       5/1999

* cited by examiner

*Primary Examiner* — Jason C Olson

(57) ABSTRACT

Writing data to magnetic tape is performed by receiving data from a host, establishing sub data sets, computing C1 and C2 ECC, forming Codeword Quad sets, writing a beginning Data Set Separator to a magnetic tape, writing a plurality of contiguous instances of the CQ Set to the magnetic tape and writing a closing DSS. The number of instances of each Codeword Pair is increased, thereby allowing the benefits of writing short tape records and improving reading reliability while reducing susceptibility to mis-tracking errors and large defects, and while reducing the negative impact on data reliability. Otherwise unused latency times are utilizing and therefore no performance penalty is incurred.

28 Claims, 15 Drawing Sheets

| | 0 | 1 |
|---|---|---|
| Track 0 | Rows 0 & 1 | Rows 32 & 33 |
| | Rows 2 & 3 | Rows 34 & 35 |
| 2 | Rows 4 & 5 | Rows 36 & 37 |
| | | |
| | | |
| 4 | | |
| | | |
| | | |
| 6 | | |
| | | |
| | | |
| 8 | | |
| | | |
| | | |
| 10 | | |
| | | |
| | | |
| 12 | | |
| | | |
| 14 | Rows 28 & 29 | Rows 60 & 61 |
| Track 15 | Rows 30 & 31 | Rows 62 & 63 |

CQ Set Number

RECORDING MULTIPLE CODEWORD SETS DURING LATENCY PERIOD

RELATED APPLICATION DATA

The present application is related to commonly-assigned and co-pending U.S. application Ser. No. 12/351,725, entitled STORING PARTIAL DATA SETS TO MAGNETIC TAPE, filed on the filing date hereof, which application is incorporated herein by reference in its entirety.

TECHNICAL FIELD

The present invention relates generally to recording data on a tape media and, in particular, to improving the probability of recovering a Codeword Pair during readback of the data.

BACKGROUND ART

In conventional recording of data to tape media, the smallest unit written to tape is the Data Set. The Data Set contains two types of data: user data and administrative information about the Data Set, the latter being in the Data Set Information Table (DSIT). All data is protected by an error correction code (ECC) to minimize data loss due to errors or defects. The Data Set comprises a number of Sub Data Sets, each containing data arranged in rows. A Sub Data Set row may contain user data or contain the DSIT. As illustrated in FIG. 1, each row consists of two interleaved byte sequences. A first level ECC (C1 ECC) is computed separately for the even bytes and for the odd bytes for each row. The resulting C1 ECC even and odd parity bytes are appended to the corresponding row, also in an interleaved fashion. The ECC protected row is the Codeword Pair (CWP). The even bytes form the even C1 Codeword while the odd bytes form the odd C1 Codeword. A second level ECC (C2 ECC) is computed for each column and the resulting C2 ECC parity bytes are appended to the corresponding columns. The ECC protected column is a C2 Codeword.

The Sub Data Set, when so protected by C1 and C2 ECC, is the smallest ECC-protected unit written to tape. Each Sub Data Set is independent with respect to ECC; that is, errors in a Sub Data Set affect only that Sub Data Set. The power of any ECC algorithm depends upon the number of parity bytes and is stated in terms of its correction capability. For a given number of C1 ECC parity bytes computed for a C1 codeword, up to K1 errors may be corrected in that codeword. And, for a given number of C2 ECC parity bytes computed for a C2 codeword, up to K2 errors may be corrected in that C2 Codeword.

It will be appreciated that multiple errors in the same Sub Data Set can overwhelm the ability of the C1 or the C2 correction power to the extent that an error occurs when the data is read. Errors may be caused by very small events such as small particles or small media defects. Errors may also be caused by larger events such as scratches, tracking errors or mechanical causes.

To mitigate the possibility that a single large error will affect multiple Codewords in a single Sub Data Set, some methods of writing place Codewords from each Sub Data Set as far apart as possible along and across the tape surface. A single error would therefore have to affect multiple Codewords from the same Sub Data Set before the ECC correction capability is overwhelmed. Spatial separation of Codewords from the same Sub Data Set reduces the risk and is accomplished in the following manner for a multi-track recording format. For each track of a set of tracks being recorded simultaneously, a Codeword Quad (CQ) is formed by combining a Codeword Pair from one Sub Data Set with a Codeword Pair from a different Sub Data Set. The resulting CQ is written on one of the multiple recorded tracks. In like manner, CQs are formed for all remaining tracks by combining Codeword Pairs, all Codeword Pairs being from differing Sub Data Sets. The group of CQs written simultaneously is called a CQ Set.

For example, in a 16-track recording format, there are 16 CQs in a CQ Set, comprising 32 Codeword Pairs. If there were 64 Sub Data Sets in a Data Set, two CQ Sets could be recorded before it were necessary to record a second Codeword Pair from a given Sub Data Set. FIG. 2 illustrates a portion of the Data Set as recorded on tape. The shaded cells indicate the row number for the eight Codeword Pairs taken from the same Sub Data Set. The arrow 200 indicates longitudinal separation of the Codeword Paris along a track and the arrow 202 indicates transverse separation across tracks. As will be appreciated, a large defect would have to span multiple shaded cells in order to overwhelm the ECC in any one Sub Data Set.

SUMMARY OF THE INVENTION

The present invention provides a method of writing data to magnetic tape. The method comprises receiving data from a host, establishing sub data sets, computing C1 and C2 ECC, forming Codeword Quad (CQ) sets, writing a beginning Data Set Separator (DSS) to a magnetic tape, writing a plurality of contiguous instances of the CQ Set to the magnetic tape and writing a closing DSS. The present invention further includes a computer program product of a computer readable medium usable with a programmable controller and having computer-readable program code embodied therein for writing data to magnetic tape. The computer program product comprises computer readable program code which causes the controller to perform the foregoing steps.

The present invention also provides a magnetic tape drive for writing data to magnetic tape. The tape drive comprises an interface through which data and instructions are exchanged with a host, a write head for recording data onto the magnetic tape, a write channel for processing data to be recorded by the write head, a read head for reading data from the magnetic tape, a read channel for processing data read by the read head and at least one drive motor for transporting the magnetic tape longitudinally past the read and write heads. The tape drive further comprises a controller coupled to control the interface, the write head, the write channel, the read head, the read channel and the at least one drive motor. The controller is operable to establish sub data sets from data received from the host, compute C1 and C2 ECC, form CQ sets, generate a beginning DSS to be recorded by the write head on the magnetic tape, direct that the write head record a plurality of contiguous instances of the CQ Set to the magnetic tape and generate a closing DSS to be recorded by the write head on the magnetic tape.

The present invention also provides recording system logic for writing data to magnetic tape. The recording system logic comprises an interface through which data and instructions are exchanged with a host, a write head for recording data onto the magnetic tape, a write channel for processing data to be recorded by the write head, a read head for reading data from the magnetic tape, a read channel for processing data read by the read head and at least one drive motor for transporting the magnetic tape longitudinally past the read and write heads. The recording system logic also comprises a controller coupled to control the interface, the write head, the write channel, the read head, the read channel and the at least one drive motor. The controller comprises logic for establishing sub data sets from data received from a host, logic for computing C1 and C2 ECC for the sub data sets, logic for forming CQ sets, logic for generating a beginning DSS to be recorded to the magnetic tape, logic for recording a plurality of contiguous instances of the CQ Set to the magnetic tape and logic for recording a closing DSS on the magnetic tape.

BRIEF DESCRIPTION OF THE DRAWINGS

FIG. 4 illustrates one method of allocating all of the Codeword Pairs from one Sub Data Set into two CQ Sets on a 16-track magnetic tape recording format;

DETAILED DESCRIPTION OF THE PREFERRED EMBODIMENT

Components described in this specification may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like. Components may also be implemented in software for execution by various types of processors. An identified component of executable code may, for instance, comprise one or more physical or logical blocks of computer instructions which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Furthermore, the described features, structures, or characteristics of the invention may be combined in any suitable manner in one or more embodiments. In the following description, numerous specific details are provided, such as examples of programming, software components, user selections, network transactions, hardware components, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known components structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented process. Other steps and processes may be conceived that are equivalent in function, logic, or effect to one or more steps, or portions thereof, of the illustrated process. Additionally, the format and symbols employed are provided to explain the logical steps of the process and are understood not to limit the scope of the process. Indeed, the arrows or other connectors are generally used to indicate only the logical flow of the process. Additionally, the order in which a particular process occurs may or may not strictly adhere to the order of the corresponding steps shown in a flowchart.

Figure 1:
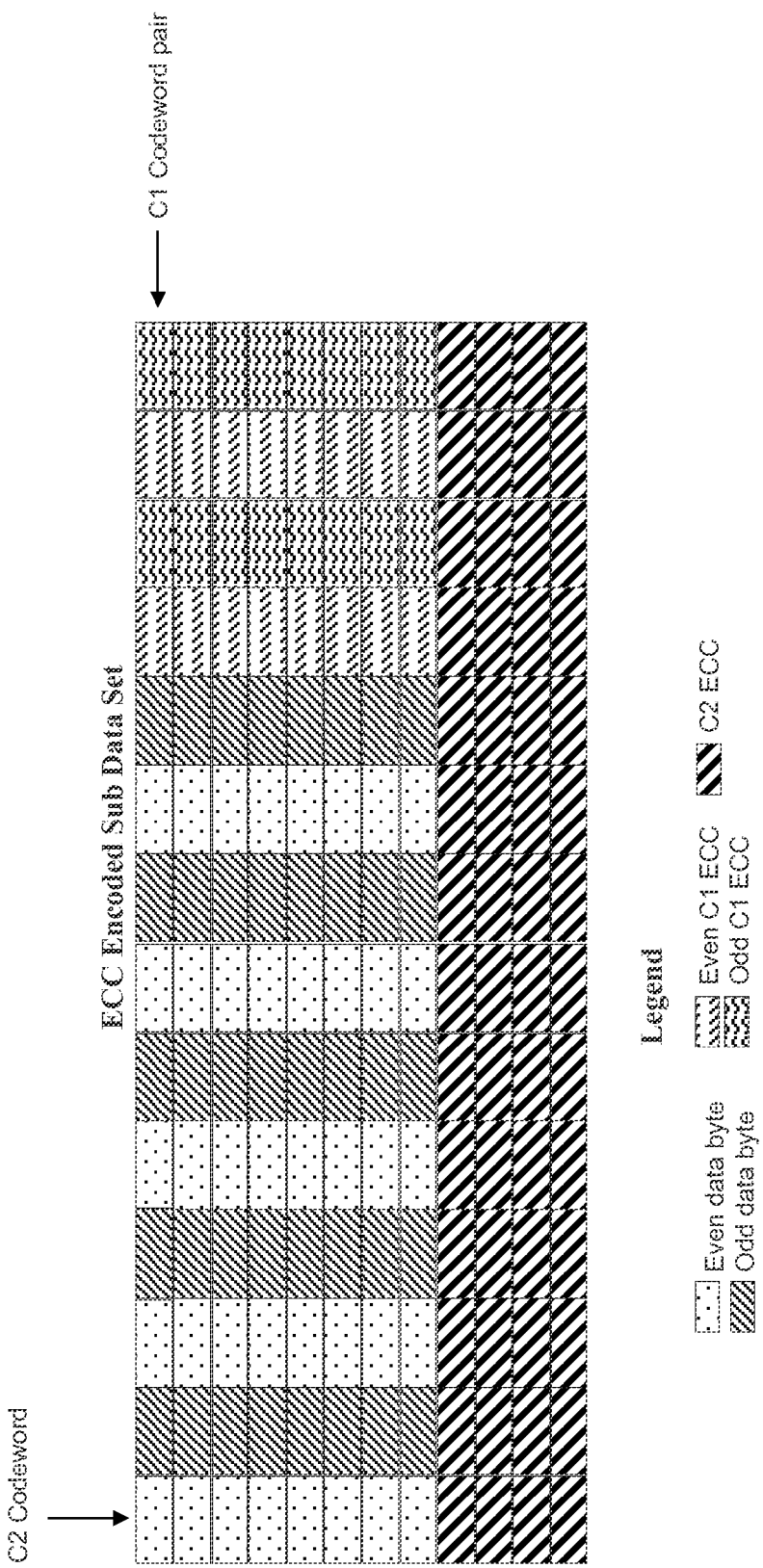
FIG. 1 illustrates an ECC encoded Sub Data Set.
Figure 2:
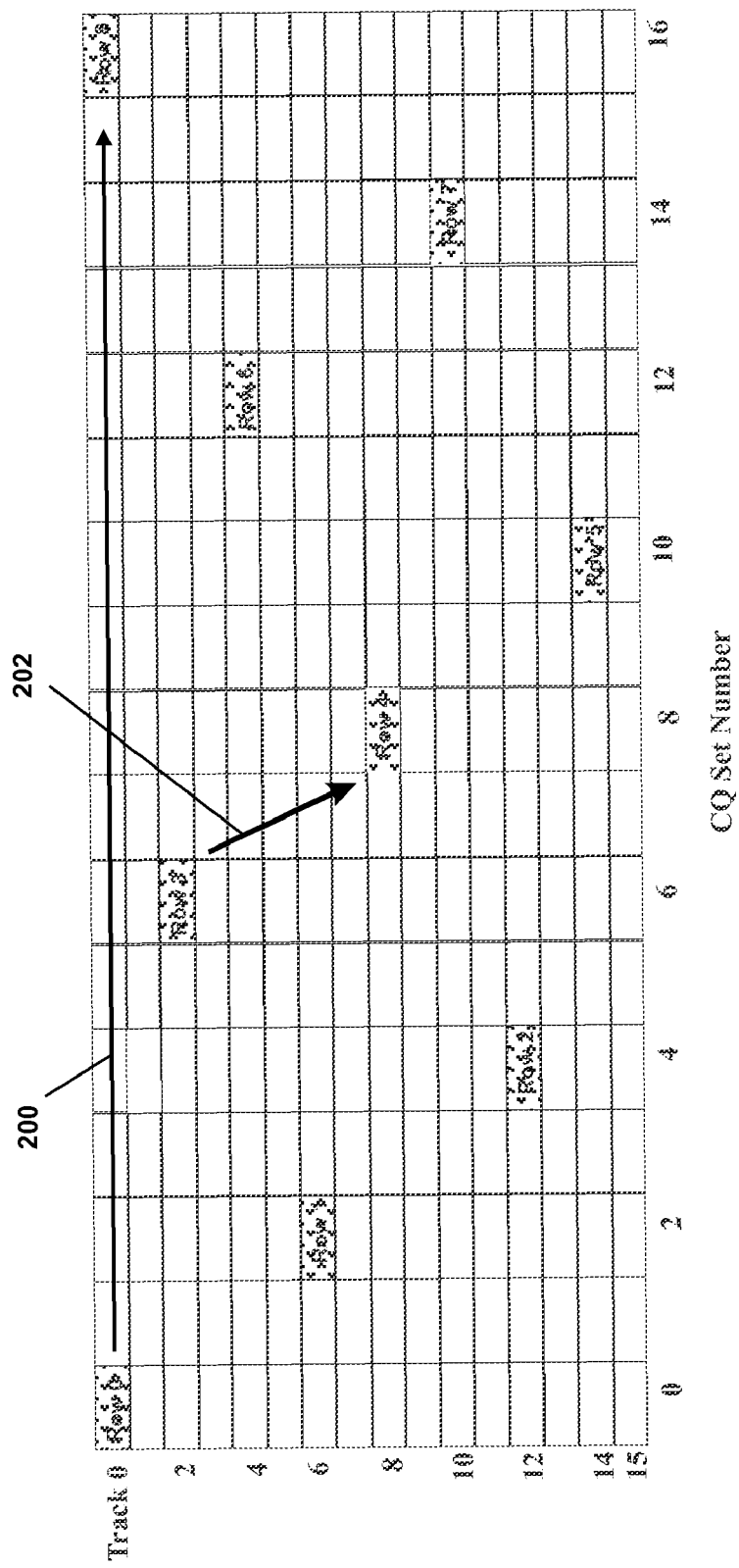
FIG. 2 illustrates an example of spatial separation of Codewords of a portion of a Data Set recorded onto a 16-track magnetic tape.
Figure 3:
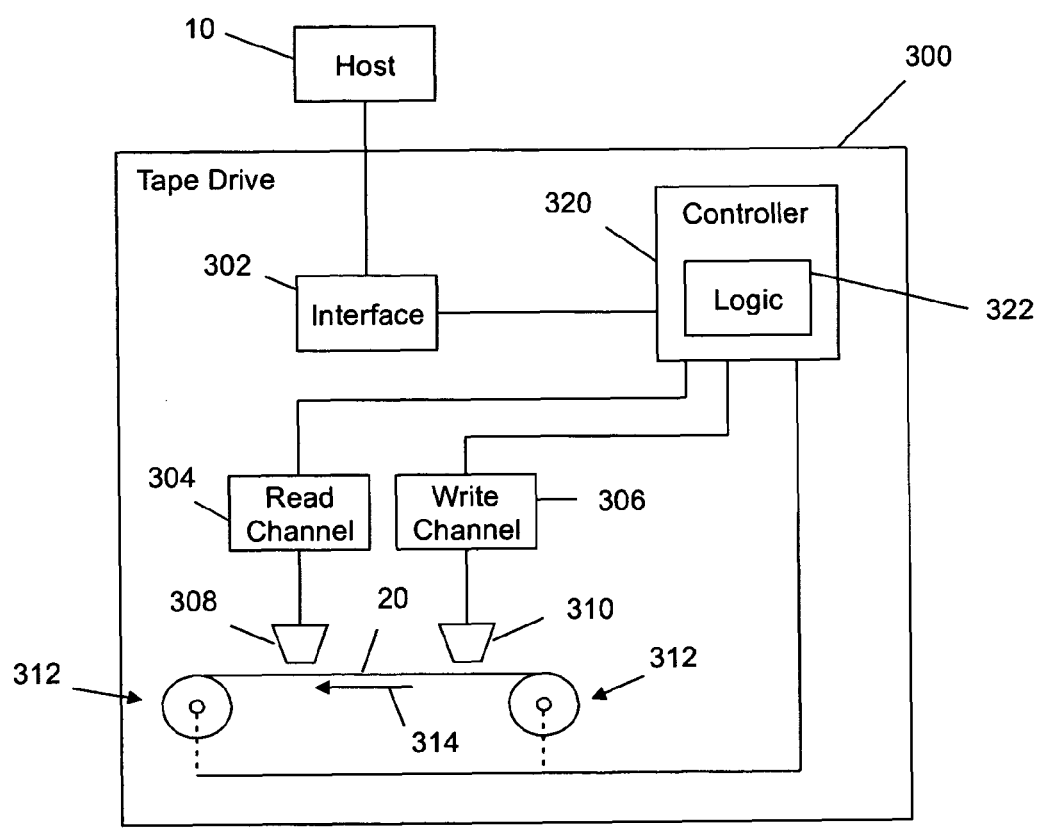
FIG. 3 is a block diagram of a magnetic tape drive with which the present invention may be implemented.

FIG. 3 is a block diagram of a magnetic tape drive 300 in which the present invention may be implemented. The drive 300 includes an interface 302 through which data, commands and other communications may be exchanged between the drive 300 and one or more hosts 10. The drive 300 further includes a controller 320, read and write channels, 304, 306, read and write heads 308, 310 and at least one drive motor 312 for transporting a magnetic tape 20 (often encased in a removable cartridge housing) longitudinally past the read and write heads 308, 310 as indicated by the arrow 314. The controller 320 includes recording system logic 322 which may be programmed to perform, or direct the performance of, steps of the present invention.

Data to be recorded on the tape 20 is transmitted from the host 10 to the interface 302 of the drive 300. The controller 320 directs that the data be sent to the write channel 306 to be formatted and encoded. The write channel then sends the processed data to the write head 310 to be recorded on one or more tracks of the tape 20. The controller 320 also controls drive motor(s) 312 with respect to the speed and direction of the tape 20 past the read and write heads 308, 310. Typically, the just-written data is read by the read head 310 to verify that it was accurately recorded. Data read from the tape 20 by the read head 310 is decoded and checked for errors by the read channel 304 before being transmitted to the host 10 through the interface 302, still under the control of the controller 320. It will be appreciated that the foregoing is only a brief summary of the operation of the tape drive 300. For clarity, many detailed steps have been omitted from the description and many components have not been shown in FIG. 3.

One writing method attempts to improve performance by writing short customer records in units smaller than the Data Set. Records are accumulated into Sub Data Sets, not waiting until all Sub Data Sets in a Data Set are filled. Accumulation is performed by putting all 64 Codeword Pairs of the same Sub Data Set into a contiguous number of CQ Sets. In a 16-track format, one Sub Data Set requires two CQ Sets. In this manner, a much smaller object (the Sub Data Set) can be written, which under some circumstances may result in significant performance improvement. However, the method compromises the capability of the error correction code (ECC) because it places all Codeword Pairs of a Sub Data Set physically near one another, thereby making multiple Codeword Pairs in a single Sub Data Set more susceptible to a single error event, such as mis-tracking or large media defect. Because the Codeword Pairs are placed close together and because there may be only one verified set of Codeword Pairs which has been successfully recorded, there is exposure that when the data is read, there may be an insufficient number of valid Codeword Pairs to successfully reconstruct the recorded data.

FIG. 4 illustrates one method of allocating all of the Codeword Pairs (rows) from one Sub Data Set into two CQ Sets, for a 16-track recording format having 64 Codeword Pairs per Sub Data Set. CQ Sets 0 and 1 represent one data record.

Figure 5:
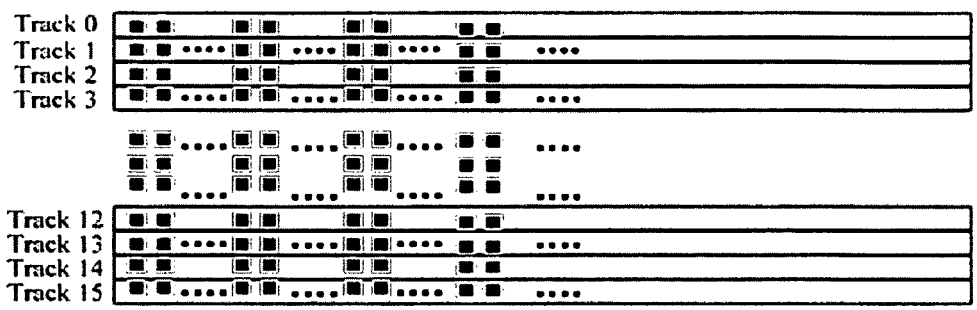
FIG. 5 illustrates four records recorded onto a 16-track magnetic tape, each record being less than or equal to the data content of one Sub Data Set and requiring 2 CQ Sets.

As previously noted, longitudinal and transverse separation between Codeword Pairs is a key contributor to reducing susceptibility to errors in conventional writing. Alternate writing of Codeword Pairs from the same Sub Data Set in the same CQ Set greatly reduces the longitudinal and transverse separation between Codeword Pairs that conventional formatting provides. The worst case data integrity compromise occurs when the record size is less than or equal to the data content of one Sub Data Set. In this case, the record is placed in one Sub Data Set, and that Sub Data Set is recorded on the tape as two adjacent CQ Sets. FIG. 5 shows four records, each of which is less than or equal to the data content of one Sub Data Set. Each record requires 2 CQ Sets. The unspecified separation between each pair of CQ Sets, and hence between each record, is indicated by ellipses.

The relative allocation of Codewords into CQs, and CQs into tracks, is unimportant with respect to error performance because an error in any Codeword Pair contributes equally to the possibility of ECC failure for the entire Sub Data Set. An error common to all tracks in one or more CQ Sets will immediately overwhelm the ECC. An error common to multiple tracks in one CQ Set, or common to fewer tracks but both CQ Sets, will be significantly more likely to overwhelm the ECC in the foregoing recording scheme than in the conventional scheme where Codeword Pairs are widely distributed longitudinally and transverse to the tape.

Figure 6:
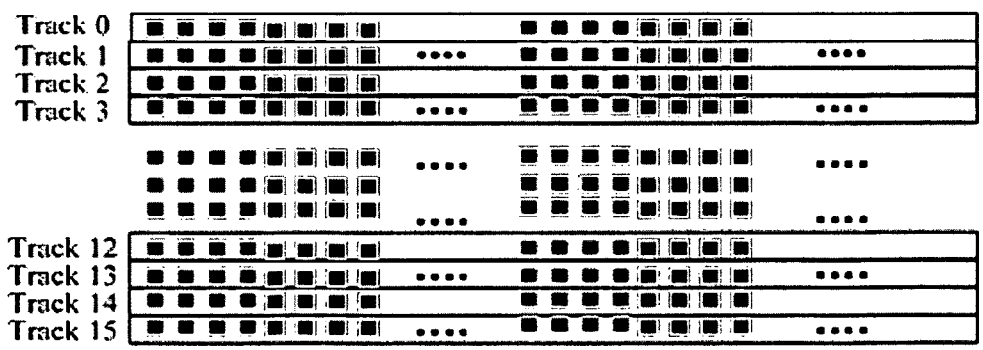
FIG. 6 illustrates 8 CQ Sets recorded onto a 16-tack magnetic tape, each pair being one Sub Data Set, in which size of each record exceeds the data content size of one Sub Data Set.

When the record size exceeds the data content size of one Sub Data Set, additional Sub Data Sets may be constructed. FIG. 6 illustrates an example in which the record size is at least 1 plus the data content of three Sub Data Sets and less than or equal to the data content of four Sub Data Sets. In this example, 8 CQ Sets are written, with each pair being one Sub Data Set. The unspecified separation between each pair of CQ Sets, and hence between each record, is indicated by ellipses.

Figure 7:
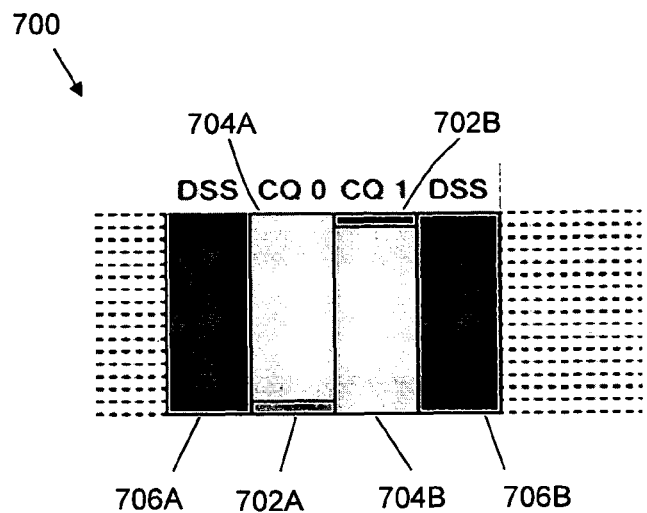
FIG. 7 illustrates an idealized example of a prior art recording format for a short record of two CQ Sets and beginning and ending DSS patterns.

Data to be written to tape is formatted to facilitate reading. As previously described, the data content is placed into Sub Data Sets and the Codeword Pairs of the Sub Data Sets are then allocated to CQ Sets. When written to tape, the CQ Sets within a group, such as a record or Data Set, are delimited by a special, easily recognized pattern known as the Data Set Separator (DSS) pattern. FIG. 7 illustrates an idealized example of this format writing a short record 700. One Codeword Quad 702A, 702B is indicated within each CQ Set 704A, 704B by a small rectangle and beginning and closing DSSs 706A, 706B bracket the record 700.

Utilizing Write-to-Read Verification Latency

Figure 8:
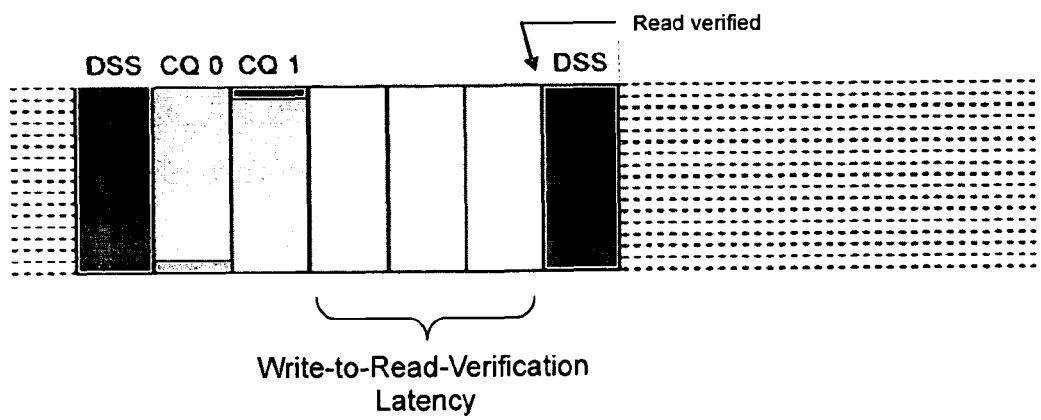
FIG. 8 illustrates a more realistic example of a prior art recording format for a short record in which the latency before recording the closing DSS is shown.

However, the idealized example of formatting of FIG. 7 is not used in practice. Modern data storage devices verify data shortly after it is written. If an error is detected, the data is rewritten. In a tape, the read head element typically follows the write head element by some distance. Thus, a written CQ Set may require some time before it passes beneath the read head element. This introduces a minimum time between writing and the ability to verify the written data. This time may also be increased by the processing time required for the tape drive to perform error detection. And, if the data needs to be rewritten, additional time may be required to prepare for the rewrite operation. The total time corresponding to the distance along the tape between the point at which a CQ Set is first written and where it may be rewritten after error detection, is called latency. Latency is typically measured in CQ Sets. For example, if the latency is 4, and a written CQ Set N is found to have an error, it may be rewritten as CQ Set N+4. FIG. 8 illustrates an example of latency while writing a single Sub Data Set in CQ Sets 0 and 1. Because CQ 0 and CQ 1 cannot be read verified until the distance along tape equivalent to 5 CQ Sets, at least this number of CQ Sets must be allocated to writing the Sub Data Set even if the data content is smaller. If no error is detected, as illustrated in FIG. 8, the write operation terminates with the DSS pattern.

If the region on tape between the last written CQ Set and the location where CQ Sets may be rewritten in case of error is left unwritten, previously written data may interfere with the current process and thus is not a good practice. If the region is filled with DSS, or writing amble (non data) frames, the previously written data will be eliminated but recovery of the written data is not enhanced. Instead, the present invention fills the region by repeatedly writing the CQ Set or Sets. The previously written data is eliminated and additional instances of the CQ Set are recorded, thereby enhancing the probability that at least one instance of each Codeword Pair in the Sub Data Set will be successfully recovered on read.

Figure 9:
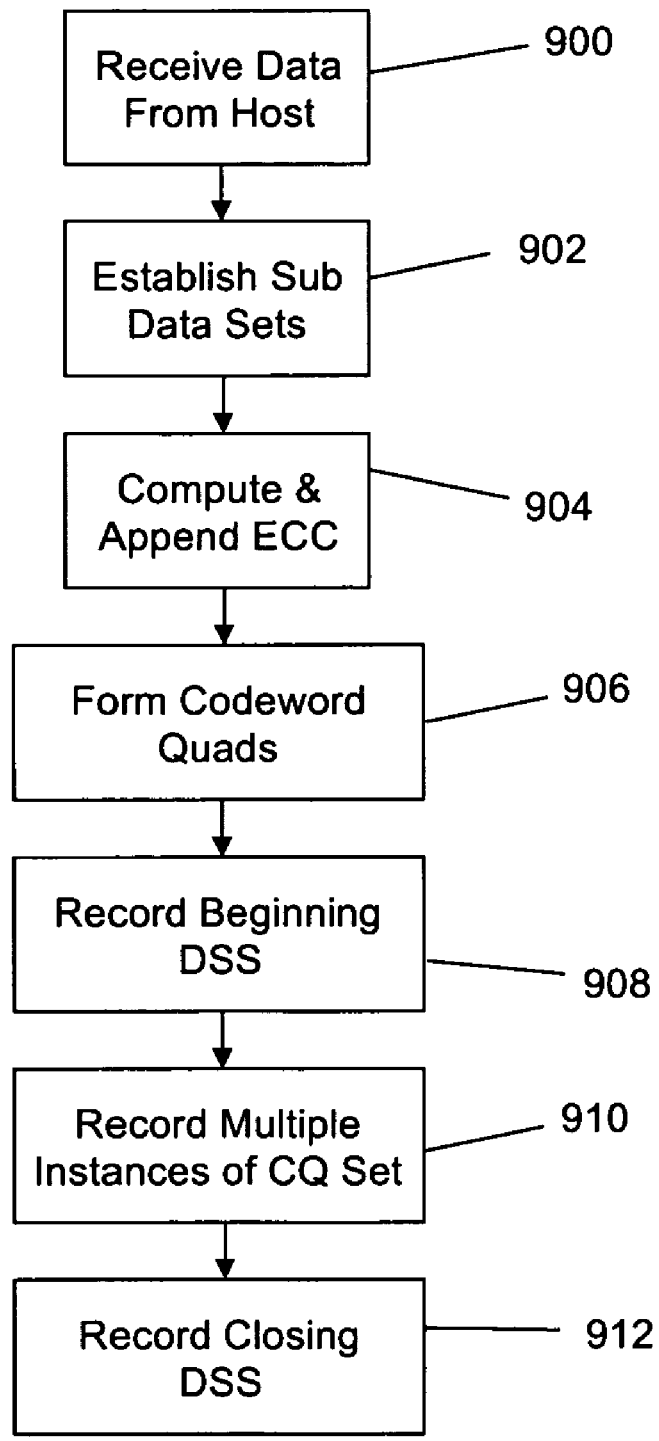
FIG. 9 is a flow chart of one embodiment of a method of the present invention.

The flowchart of FIG. 9 illustrates a method of the present invention. Data is received from the host 10 by the drive 300 (step 900). Under the direction of the recording system logic 322, Sub Data Sets are established (step 902) and C1 and C2 ECC symbols are computed and appended to the Sub Data Sets (step 904). Codeword Quads are then formed (step 906) and the write head 306 records a beginning DSS recorded to the tape 20 (step 908). Instead of recording a single instance of the CQ Sets 0 and 1 to the tape 20 and allowing the latency to be wasted, multiple instances of the CQ Sets are recorded to the tape 20 (step 910) thereby increasing the probability of recovering at least one instance of each Codeword Pair. Subsequently, a closing DSS is recorded to the tape 20 (step 912).

Figure 10:
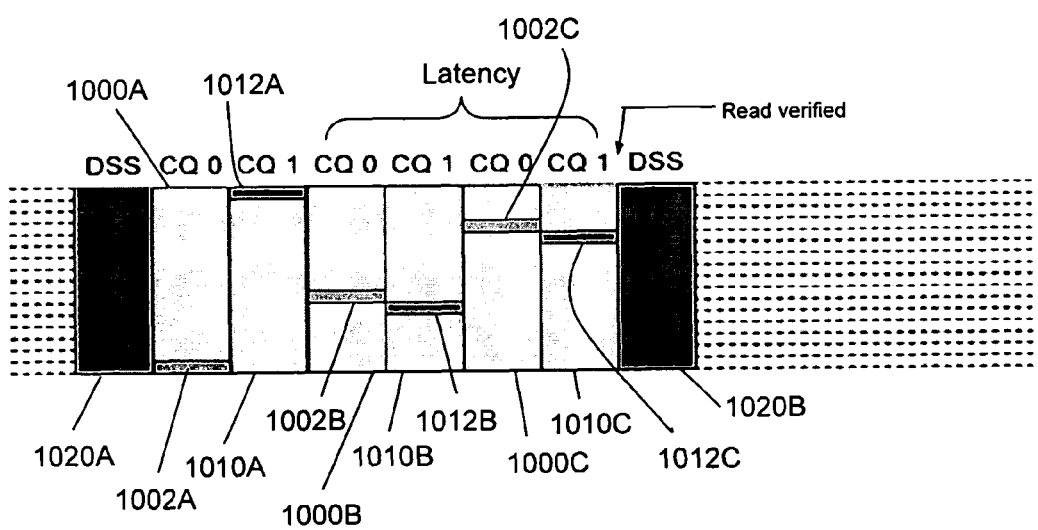
FIG. 10 is a flow chart of an embodiment of the present invention in which multiple CQ Sets are recorded during a write-to-read-verification latency in a system with latency of 5.

FIG. 10 illustrates one variation of the method of FIG. 9. The Sub Data Set is written in a system with latency of 5. CQ Sets 0 and 1 1000A, 1010A are the first instance of the Sub Data Set and follow the beginning DSS 1020. Due to the latency, CQ 0 cannot be read verified until the third instance of CQ 0 or CQ 1. In accordance with this aspect of the present invention, the CQ Set pairs are repeatedly written until the first CQ 0 and CQ 1 can be read verified; that is, until the latency of 5 has ended. In the illustrated system, two additional pairs of CQ 0 and CQ 1 1000B, 10108 are written. If the first instance of CQ 0 and CQ 1 100A, 1010A has no error, no additional CQ Sets for this Sub Data Set are written and the write operation terminates with the closing DSS pattern 1020B. Therefore a total of three instances of the Sub Data Set are written, only the first of which was read verified. Thus, a benefit of repeating the CQ Sets is that at least 3 instances of any one Codeword Pair exist, each separated longitudinally by at least the length of one CQ Set, thereby increasing the probability of recovering at least one instance of each Codeword Pair.

FIG. 10 also illustrates a further aspect of the present invention. The shaded bars 1002A, 1002B, 1002C and 1012A, 1012B, 1012C within the CQs illustrate how a particular Codeword Quad is "rotated" transversely across tracks with each instance of the CQ Set to guard against dead track errors. In contrast, Codeword Quads in the conventional LTO format are rotated only when rewritten due to error.

Figure 11:
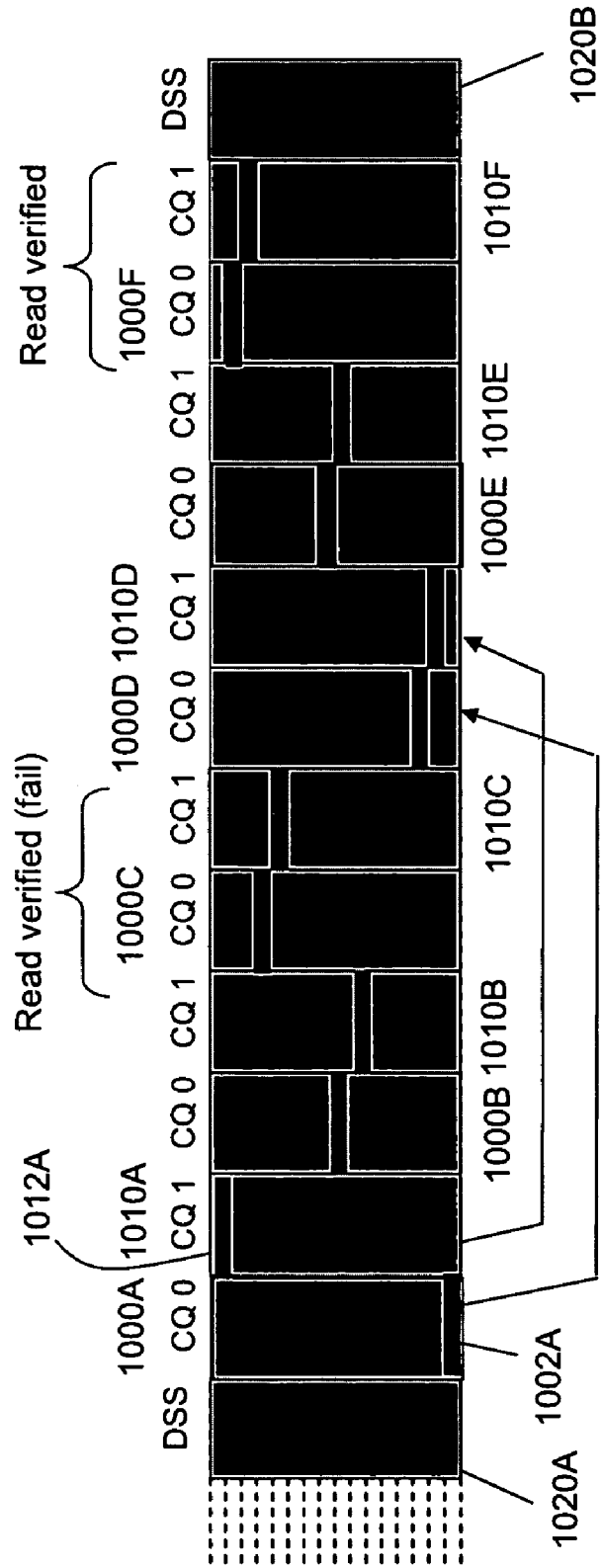
FIG. 11 illustrates writing multiple CQ Sets following the detection of an error in one of the originally written CQ Sets.

If, as illustrated in FIG. 11, an error was detected in either the first CQ 0 1000A or the first CQ1 1010A after a first attempt to read verify, both are rewritten 1000D, 1010D and followed again by the number of CQ Set repeats 1000E, 1000F and 1010E, 1010F (such as two in the illustrated example) to allow read verification of that rewritten pair. Therefore a total of six instances of the Sub Data Set are written, of which only the first and fourth were read verified, with the first verification having had one or more errors. Once the read verify operation is successful, the closing DSS 1020B is written.

Figure 12:
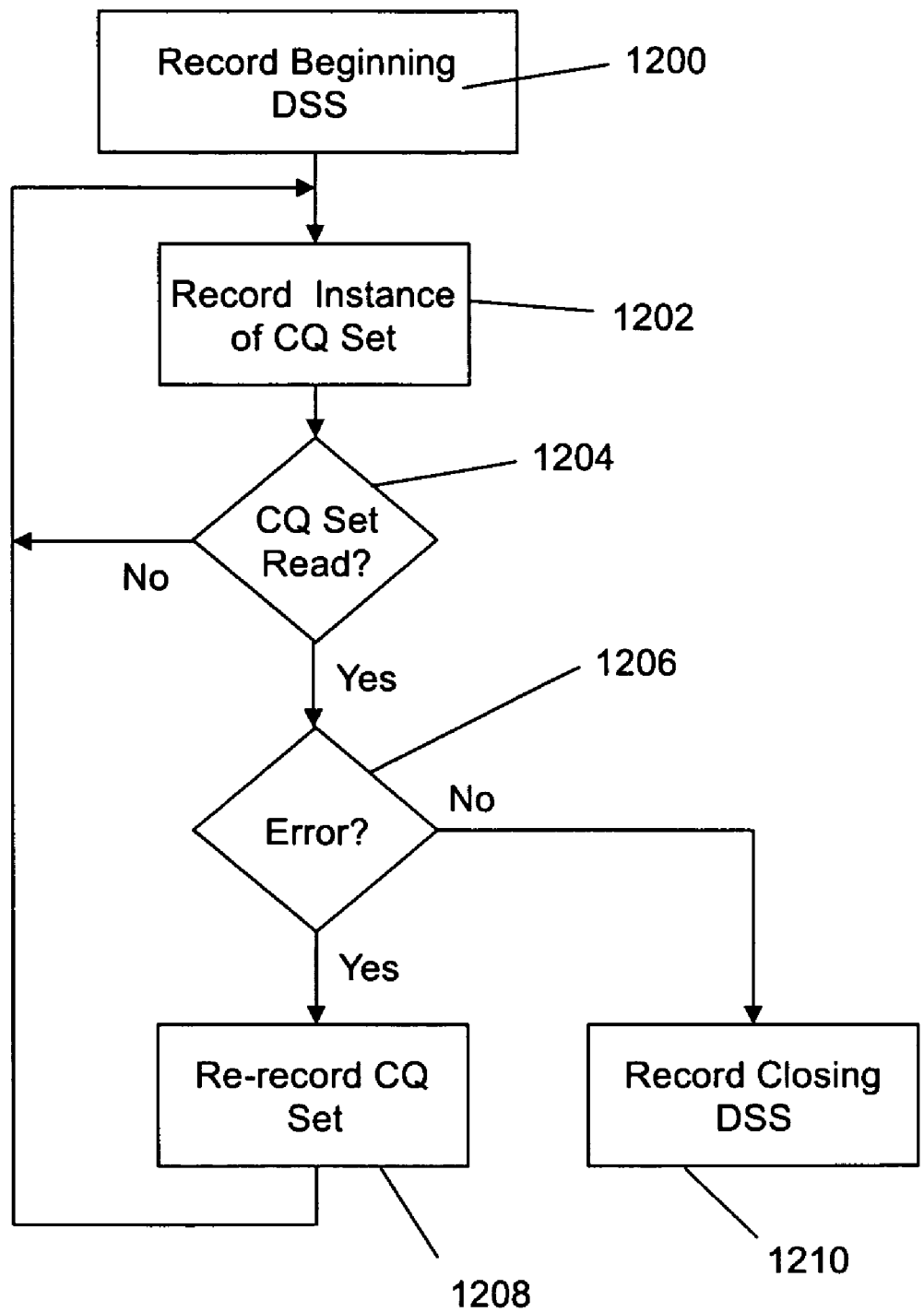
FIG. 12 is a flow chart of an embodiment of a method of the present invention in which multiple CQ Sets are written during the write-to-read-verification latency.

FIG. 12 is a flowchart of this aspect of the present invention. A beginning DSS is recorded to the tape 20 (step 1200) and a first instance of the CQ Set is then recorded (step 1202). A determination is made as to whether the CQ Set has been read for verification (step 1204). If not, another instance of the CQ Set is recorded (step 1202) and the process repeats until the first instance of the CQ Set is read-verified. If an error is detected (step 1206), the CQ Set is re-recorded (step 1208) and the process returns to record additional instances of the CQ Set (step 1202) until the re-recorded CQ Set is read-verified (step 1204). If an error is again detected (step 1206), the process repeats. When the CQ Set is read-verified with no error, the closing DSS is recorded (step 1210). Thus, multiple instances of the CQ Set are recorded during a previously wasted latency period.

Figure 13:
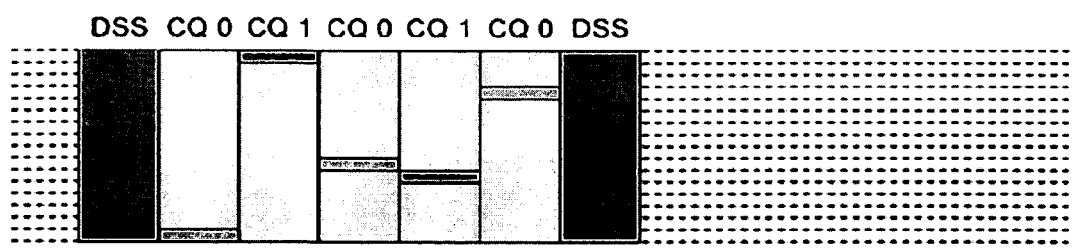
FIG. 13 illustrates writing multiple CQ Sets during the write-to-read-verification latency without writing a third (final) CQ 1 in a no-error situation.
Figure 14:
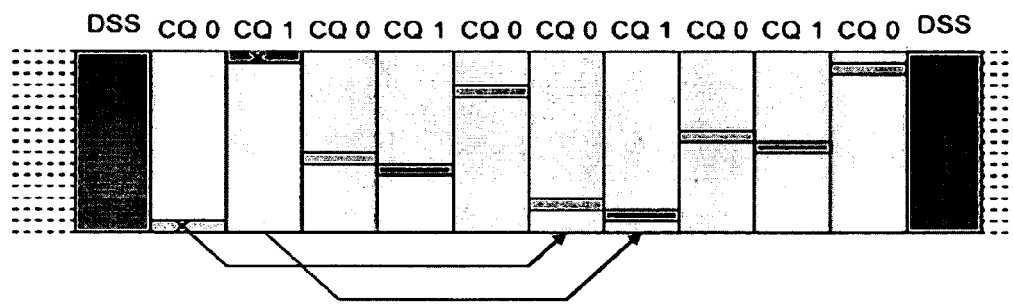
FIG. 14 illustrates writing multiple CQ Sets during the write-to-read-verification latency without writing a third (final) CQ 1 in an error situation.

A variation on this aspect of the present invention may be implemented if the latency allows verification and rewriting after the third instance of CQ 0 such that the third CQ 1 need not be written. This variation is illustrated in FIG. 13 for the case in which there is no error and is illustrated in FIG. 14 for the case in which there is an error.

Utilizing Record-Complete-to-Host-Response Latency

Figure 15:
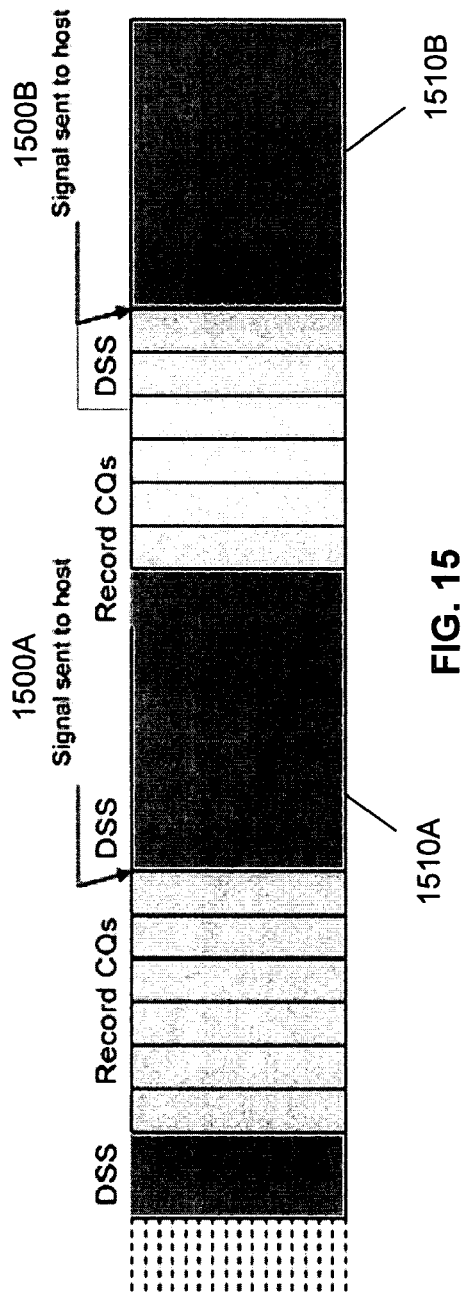
FIG. 15 illustrates a prior art recording format in which an extended closing DSS is written after a Record Complete signal has been transmitted to the host until new data is received from the host.

As illustrated in FIG. 15, in a prior method of writing data, when the drive completes writing of a record and the CQ Sets have been verified, it sends a signal 1500A, 1500B to the host to get another record. The drive may then stop or may continue writing multiple DSSs 1510A, 1510B until the host responds with the next record. Thus, the writing sequence of CQ Sets can be described as: (a) the host sends a record to the drive for recording; (b) a beginning DSS is written; (c) followed by the essential CQ Sets; (d) the drive continues writing an unspecified sequence until the two CQ Sets pass beneath the read head; (e) when both CQ Sets are verified, a terminating DSS begins; and (f) when the CQ Sets are assuredly committed to tape, the tape drive sends a 'Record Complete' signal to the host indicating successful writing, at which time the drive waits for the host to send another record for recording. This process repeats indefinitely along the tape.

Figure 16:
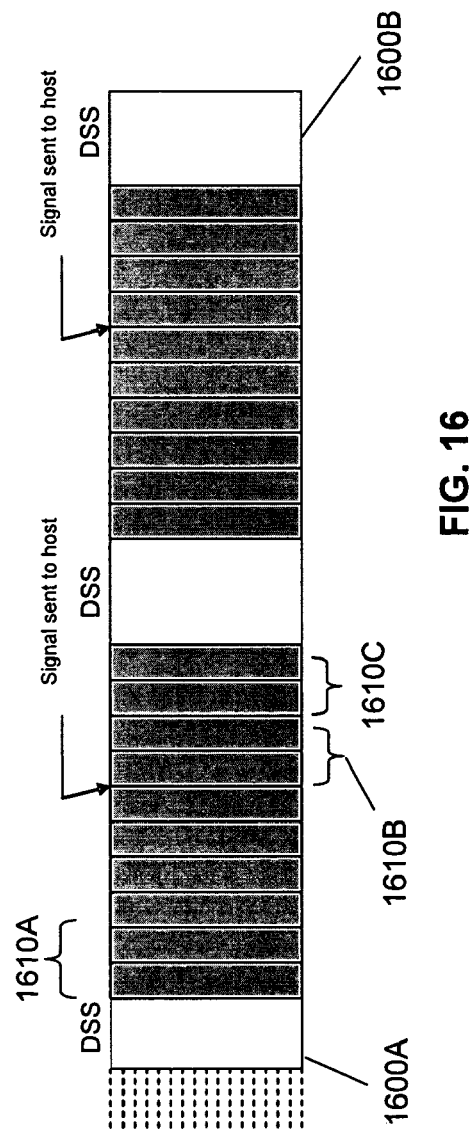
FIG. 16 illustrates a format of an embodiment of the present invention in which multiple CQ Sets are recorded during the latency following the Record Complete signal has been transmitted to the host until new data is received from the host.
Figure 17:
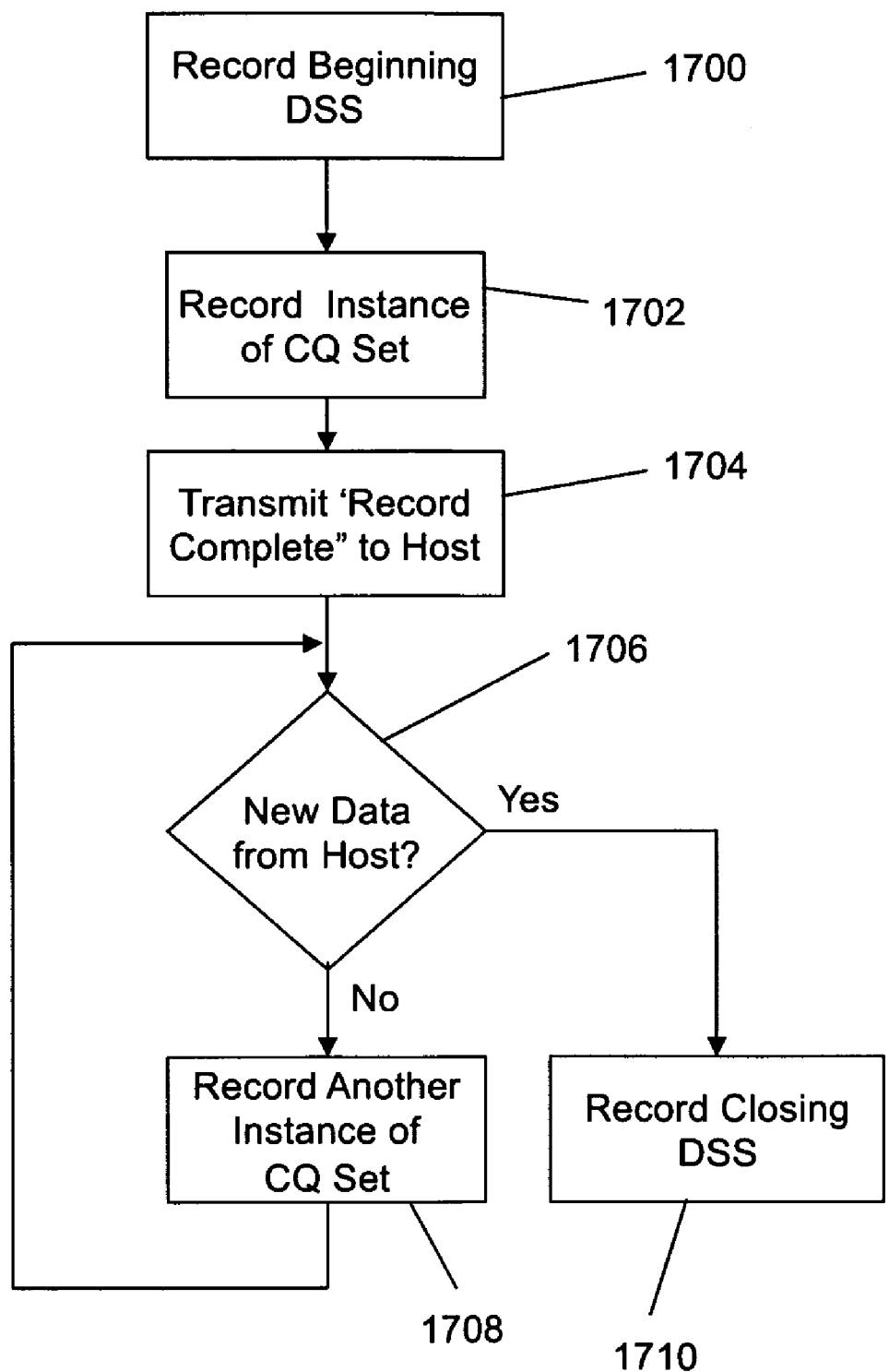
FIG. 17 is a flow chart of an embodiment of a method of the present invention in which multiple CQ Sets are written during the record-complete-to-host-response latency.

In order to record as many instances of each Codeword Pair as possible by using latency times to repeat CQ Sets, in accordance with another aspect of the present invention, the latency time between the drive 300 sending the 'Record Complete' signal to the host and the host 10 responding with the next record is utilized to record additional instances of the CQ Sets, thus again the probability of recovering at least one instance of each Codeword Pair is increased. As illustrated in FIG. 16 and the flowchart of FIG. 17, a beginning DSS 1600A is recorded to the tape 20 (step 1700) and a first instance of the CQ Set 1610A is then recorded (step 1702). When the CQ Set 1610A has been verified, the controller 320 then transmits a 'Record Complete' signal (or other comparable signal) 1602 to the host 10 (step 1704) indicating that the CQ Set 1610A has been written and read-verified. A determination is made as to whether new data has been received from the host 10 (step 1706). If not, another instance 1610B of the CQ Set is recorded (step 1708) and the process is repeated 1610C until new data is received from the host 10, at which time the closing DSS 1600B is recorded (step 1710).

Figure 18:
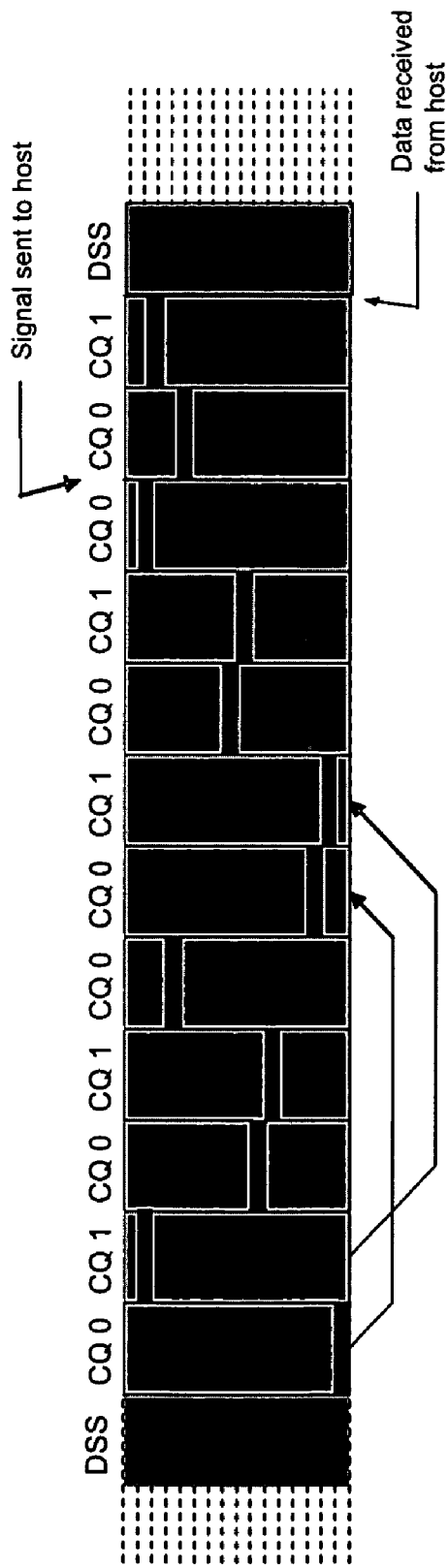
FIG. 18 illustrates a format of an embodiment of the present invention in which multiple CQ Sets are recorded during the write-to-read-verification latency and during the latency following the Record Complete signal.
Figure 19:
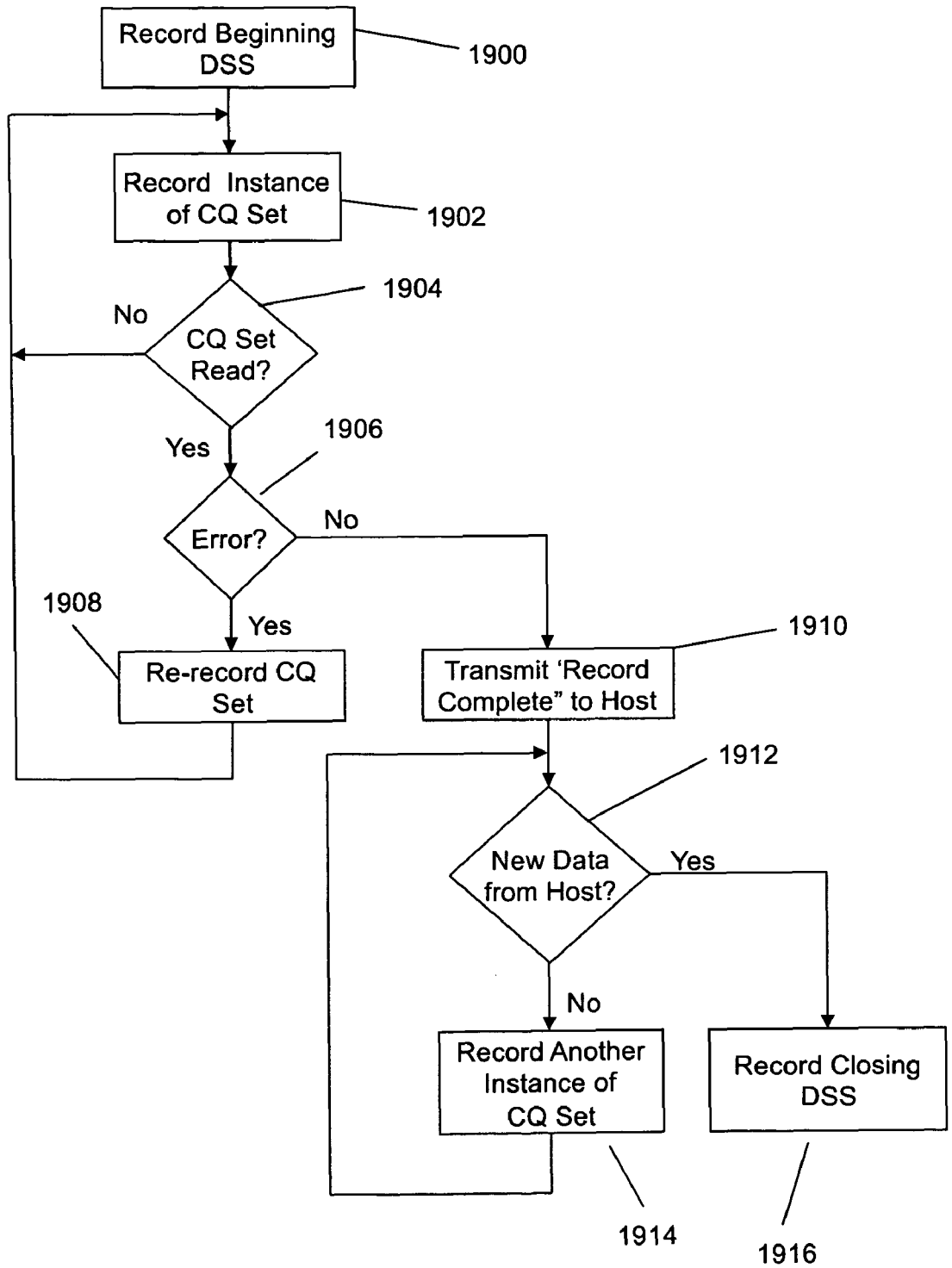
FIG. 19 is a flow chart of an embodiment of a method of the present invention in which multiple CQ Sets are written during the write-to-read-verification latency and during the record-complete-to-host-response latency.

FIG. 18 and the flowchart of FIG. 19 illustrate writing CQ Sets using the read-verify latency and the record-complete-to-host latency aspects of the present invention together. The host sends a record to the drive for recording and the beginning DSS is written (step 1900). The essential (initial) CQ Sets are then recorded (step 1902). The drive continues writing an additional instances of the CQ Sets until the two initial CQ Sets pass beneath the read head (step 1904), satisfying the latency read verify requirement. If an error is detected (step 1906), the essential CQ Sets are re-recorded (step 1908) and the process repeats until no errors are detected. When the required number of CQ Sets are assuredly committed to tape with no errors (step 1906), which may be any number depending upon the desired robustness of the system, the drive sends a 'Record Complete' signal to the host (step 1910) indicating successful writing and waits for the host to send another record for writing. Instead of writing a DSS, the drive continues to write multiple instances of the CQ Sets of the current record (step 1914) until the host responds with the next record (step 1912) and the drive has set up the new write operation, or until a predetermined number of CQ Set pairs have been successfully read verified. The drive then begins the terminating DSS (step 1616). This process repeats indefinitely along the tape.

Thus, in accordance with the present invention, the number of instances of each Codeword Pair is increased and their physical separation is also preferably increased both longitudinally and transversely, thereby allowing the benefits of writing short tape records while reducing susceptibility to mis-tracking errors and large defects, and while reducing the negative impact on data reliability. The present invention does so utilizing otherwise unused latency times and therefore incurs no performance penalty. Reading reliability is improved because there are additional instances of each Codeword Pair and because physical separation of Codeword Pairs increases with each rewritten instance. Thus, the present invention improves ECC capability by: (1) using the latency between the write and the read head to record multiple copies of the Codeword Pairs instead of recording only one instance of each Codeword Pair; (2) continuing to write multiple copies of the Codeword Pairs until the host actually responds with the next record instead of requesting a new record from the host and then terminating writing; and (3) rotating the track in which a specific Codeword Pair is written each time the Codeword Pair is written.

It is important to note that while the present invention has been described in the context of a fully functioning data storage system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for writing data to magnetic tape.

What is claimed is:

1. A method of writing data to magnetic tape, comprising:
   receiving data from a host;
   establishing sub data sets;
   computing C1 and C2 ECC;
   forming Codeword Quad (CQ) sets;
   writing a beginning Data Set Separator (DSS) to a magnetic tape;
   during a latency before a specified function is completed, writing a plurality of instances of a CQ Set to the magnetic tape; and
   after the specified function is completed, writing a closing DSS.

2. The method of claim 1, wherein writing the plurality of instances of the CQ Set comprises:
   writing a first instance of the CQ Set;
   determining if the first instance of the CQ Set has been read-verified;
   if the first instance of the CQ Set has not been read-verified:
      writing another instance of the CQ Set; and
      returning to the determining step; and
   if the first instance of the CQ Set has been read-verified:
      ascertaining if an error has been detected in the first instance of the CQ Set;
      if an error has been detected:
         re-writing the CQ Set; and
         returning to the determining step; and
      if an error has not been detected, writing the closing DSS.

3. The method of claim 2, further comprising transversely separating instances of the CQ Set across multiple tracks of the magnetic tape.

4. The method of claim 1, wherein writing the plurality of instances of the CQ Set comprises:
   writing a first instance of the CQ Set;
   transmitting a 'Record Complete' signal to the host;
   determining if new data has been received from the host;
   if new data has not been received from the host:
      writing another instance of the CQ Set; and
      returning to the determining step; and
   if new data has been received from the host, writing the closing DSS.

5. The method of claim 4, further comprising rotating transversely separating instances of the CQ Set across multiple tracks of the magnetic tape.

6. The method of claim 1, wherein writing the plurality of instances of the CQ Set comprises:
   determining if the first instance of the CQ Set has been read-verified;
   if the first instance of the CQ Set has not been read-verified:
      writing another instance of the CQ Set; and
      returning to the determining step; and
   if the first instance of the CQ Set has been read-verified:
      ascertaining if an error has been detected in the first instance of the CQ Set;
      if an error has been detected:
         re-writing the CQ Set; and
         returning to the first determining step; and
      if an error has not been detected:
         transmitting a 'Record Complete' signal to the host;
         determining if new data has been received from the host;
         if new data has not been received from the host:
            writing another instance of the CQ Set; and
            returning to the second determining step; and
         if new data has been received from the host, writing the closing DSS.

7. The method of claim 6, further comprising rotating transversely separating instances of the CQ Set across multiple tracks of the magnetic tape.

8. A magnetic tape drive for writing data to magnetic tape, comprising:
   an interface through which data and instructions are exchanged with a host;
   a write head for recording data onto the magnetic tape;
   a write channel for processing data to be recorded by the write head;
   a read head for reading data from the magnetic tape;
   a read channel for processing data read by the read head;
   at least one drive motor for transporting the magnetic tape longitudinally past the read and write heads; and
   a controller coupled to control the interface, the write head, the write channel, the read head, the read channel and the at least one drive motor, the controller operable to:
      establish sub data sets from data received from the host;
      compute C1 and C2 ECC;
      form Codeword Quad (CQ) sets;
      generate a beginning Data Set Separator (DSS) to be recorded by the write head on the magnetic tape;
      during a latency before a specified function is completed, direct that the write head record a plurality of instances of a CQ Set to the magnetic tape; and
      after the specified function is completed, generate a closing DSS to be recorded by the write head on the magnetic tape.

9. The magnetic tape drive of claim 8, wherein the controller, when directing that the write head record a plurality of instances of the CQ Set to the magnetic tape, is further operable to:
  direct that the write head record a first instance of the CQ Set;
  determine if the first instance of the CQ Set has been read-verified;
  if the first instance of the CQ Set has not been read-verified:
    direct that the write head record another instance of the CQ Set; and
    return to the determining step; and
  if the first instance of the CQ Set has been read-verified:
    ascertain if an error has been detected in the first instance of the CQ Set;
    if an error has been detected:
      direct that the write head re-record the CQ Set; and
      return to the determining step; and
    if an error has not been detected, direct that the write head record the closing DSS.

10. The magnetic tape drive of claim 9, wherein the controller is further operable to transversely separate instances of the CQ Set across multiple tracks of the magnetic tape.

11. The magnetic tape drive of claim 8, wherein the controller, when directing that the write head record the plurality of instances of the CQ Set, is further operable to:
  direct that the write head record a first instance of the CQ Set;
  transmit a 'Record Complete' signal to the host;
  determine if new data has been received from the host;
  if new data has not been received from the host:
    direct that the write head record another instance of the CQ Set; and
    return to the determining step; and
  if new data has been received from the host, direct that the write head record the closing DSS.

12. The magnetic tape drive of claim 11, wherein the controller is further operable to transversely separate instances of the CQ Set across multiple tracks of the magnetic tape.

13. The magnetic tape drive of claim 8, wherein the controller, when directing that the write head record the plurality of instances of the CQ Set, is further operable to:
  determine if the first instance of the CQ Set has been read-verified;
  if the first instance of the CQ Set has not been read-verified:
    direct that the write head record another instance of the CQ Set; and
    return to the determining step; and
  if the first instance of the CQ Set has been read-verified:
    ascertain if an error has been detected in the first instance of the CQ Set;
    if an error has been detected:
      direct that the write head re-record the CQ Set; and
      return to the first determining step; and
    if an error has not been detected:
      transmit a 'Record Complete' signal to the host;
      determine if new data has been received from the host;
      if new data has not been received from the host:
        direct that the write head record another instance of the CQ Set; and
        return to the second determining step; and
      if new data has been received from the host, direct that the write head record the closing DSS.

14. The magnetic tape drive of claim 13, wherein the controller is further operable to transversely separate instances of the CQ Set across multiple tracks of the magnetic tape.

15. Recording system logic for writing data to magnetic tape, comprising:
  an interface through which data and instructions are exchanged with a host;
  a write head for recording data onto the magnetic tape;
  a write channel for processing data to be recorded by the write head;
  a read head for reading data from the magnetic tape;
  a read channel for processing data read by the read head;
  at least one drive motor for transporting the magnetic tape longitudinally past the read and write heads; and
  a controller coupled to control the interface, the write head, the write channel, the read head, the read channel and the at least one drive motor, the controller comprising:
    logic for establishing sub data sets from data received from a host;
    logic for computing C1 and C2 ECC for the sub data sets;
    logic for forming Codeword Quad (CQ) sets;
    logic for generating a beginning Data Set Separator (DSS) to be recorded to the magnetic tape;
    logic for recording a plurality of instances of a CQ Set to the magnetic tape during a latency before a specified function is completed; and
    logic for recording a closing DSS on the magnetic tape after the specified function is completed.

16. The recording system logic of claim 15, wherein the logic for recording a plurality of instances of the CQ Set to the magnetic tape comprises:
  logic for recording a first instance of the CQ Set;
  logic for determining if the first instance of the CQ Set has been read-verified;
  if the first instance of the CQ Set has not been read-verified:
    logic for recording another instance of the CQ Set; and
    logic for returning to the determining step; and
  if the first instance of the CQ Set has been read-verified:
    logic for ascertaining if an error has been detected in the first instance of the CQ Set;
    if an error has been detected:
      logic for re-recording the CQ Set; and
      logic for returning to the determining step; and
    if an error has not been detected, logic for recording the closing DSS.

17. The recording system logic of claim 16, further comprising logic for transversely separating instances of the CQ Set across multiple tracks of the magnetic tape.

18. The recording system logic of claim 15, wherein the logic for recording the plurality of instances of the CQ Set comprises:
  logic for recording a first instance of the CQ Set;
  logic for transmitting a 'Record Complete' signal to the host;
  logic for determining if new data has been received from the host;
  if new data has not been received from the host:
    logic for recording another instance of the CQ Set; and
    logic for returning to the determining step; and
  if new data has been received from the host, logic for recording the closing DSS.

19. The recording system logic of claim 18, further comprising logic for transversely separating instances of the CQ Set across multiple tracks of the magnetic tape.

20. The recording system logic of claim 15, wherein logic for recording the plurality of instances of the CQ Set comprises:
  logic for determining if the first instance of the CQ Set has been read-verified;
  if the first instance of the CQ Set has not been read-verified:
    logic for recording another instance of the CQ Set; and returning to the determining step; and
  if the first instance of the CQ Set has been read-verified:
    logic for ascertaining if an error has been detected in the first instance of the CQ Set;
    if an error has been detected:
      logic for re-recording the CQ Set; and
      logic for returning to the first determining step; and
    if an error has not been detected:
      logic for transmitting a 'Record Complete' signal to the host;
      logic for determining if new data has been received from the host;
      if new data has not been received from the host:
        logic for recording another instance of the CQ Set; and
        returning to the second determining step; and
      if new data has been received from the host, logic for recording the closing DSS.

21. The recording system logic of claim 20, further comprising logic for rotating transversely separating instances of the CQ Set across multiple tracks of the magnetic tape.

22. A computer program product of a computer readable storage medium usable with a programmable controller, the computer program product having computer-readable program code embodied therein for writing data to magnetic tape, the computer program product comprising:
  computer readable program code which causes the controller to receive data from a host;
  computer readable program code which causes the controller to establish sub data sets;
  computer readable program code which causes the controller to compute C1 and C2 ECC;
  computer readable program code which causes the controller to form Codeword Quad (CQ) sets;
  computer readable program code which causes the controller to write a beginning Data Set Separator (DSS) to a magnetic tape;
  computer readable program code which causes the controller to write a plurality of instances of a CQ Set to the magnetic tape during a latency before a specified function is completed; and
  computer readable program code which causes the controller to write a closing DSS after the specified function is completed.

23. The computer program product of claim 22, wherein the computer readable program code which causes the controller to write the plurality of instances of the CQ Set comprises:
  computer readable program code which causes the controller to write a first instance of the CQ Set;
  computer readable program code which causes the controller to determine if the first instance of the CQ Set has been read-verified;
  if the first instance of the CQ Set has not been read-verified:
    computer readable program code which causes the controller to write another instance of the CQ Set; and
    computer readable program code which causes the controller to return to the determining step; and
  if the first instance of the CQ Set has been read-verified:
    computer readable program code which causes the controller to ascertain if an error has been detected in the first instance of the CQ Set;
    if an error has been detected:
      computer readable program code which causes the controller to re-write the CQ Set; and
      computer readable program code which causes the controller to return to the determining step; and
    if an error has not been detected, computer readable program code which causes the controller to write the closing DSS.

24. The computer program product of claim 23, further comprising computer readable program code which causes the controller to transversely separating instances of the CQ Set across multiple tracks of the magnetic tape.

25. The computer program product of claim 22, wherein the computer readable program code which causes the controller to write the plurality of instances of the CQ Set comprises:
  computer readable program code which causes the controller to write a first instance of the CQ Set;
  computer readable program code which causes the controller to transmit a 'Record Complete' signal to the host;
  computer readable program code which causes the controller to determine if new data has been received from the host;
  if new data has not been received from the host:
    computer readable program code which causes the controller to write another instance of the CQ Set; and
    computer readable program code which causes the controller to return to the determining step; and
  if new data has been received from the host, computer readable program code which causes the controller to write the closing DSS.

26. The computer program product of claim 25, further comprising computer readable program code which causes the controller to transversely separate instances of the CQ Set across multiple tracks of the magnetic tape.

27. The computer program product of claim 22, wherein the computer readable program code which causes the controller to write the plurality of instances of the CQ Set comprises:
  computer readable program code which causes the controller to determine if the first instance of the CQ Set has been read-verified;
  if the first instance of the CQ Set has not been read-verified:
    computer readable program code which causes the controller to write another instance of the CQ Set; and
    computer readable program code which causes the controller to return to the determining step; and
  if the first instance of the CQ Set has been read-verified:
    computer readable program code which causes the controller to ascertain if an error has been detected in the first instance of the CQ Set;
    if an error has been detected:
      computer readable program code which causes the controller to re-write the CQ Set; and
      computer readable program code which causes the controller to return to the first determining step; and
    if an error has not been detected:
      computer readable program code which causes the controller to transmit a 'Record Complete' signal to the host;

computer readable program code which causes the controller to determine if new data has been received from the host;
if new data has not been received from the host:
 computer readable program code which causes the controller to write another instance of the CQ Set; and
 computer readable program code which causes the controller to return to the second determining step; and if new data has been received from the host, computer readable program code which causes the controller to write the closing DSS.

28. The computer program product of claim 27, further comprising computer readable program code which causes the controller to transversely separating instances of the CQ Set across multiple tracks of the magnetic tape.

* * * * *